(12) United States Patent
Fugel et al.

(10) Patent No.: US 9,145,916 B2
(45) Date of Patent: Sep. 29, 2015

(54) AXIAL ANTI-FRICTION BEARING, IN PARTICULAR AXIAL NEEDLE BEARING

(75) Inventors: Wolfgang Fugel, Nürnberg (DE); Wolfram Kruhöffer, Aurachtal (DE)

(73) Assignee: SCHAEFFLER TECHNOLOGIES GMBH & CO. KG, Herzogenaurach (DE)

( * ) Notice: Subject to any disclaimer, the term of this patent is extended or adjusted under 35 U.S.C. 154(b) by 0 days.

(21) Appl. No.: 13/702,535

(22) PCT Filed: Jun. 7, 2011

(86) PCT No.: PCT/EP2011/059319
§ 371 (c)(1),
(2), (4) Date: Feb. 19, 2013

(87) PCT Pub. No.: WO2012/016731
PCT Pub. Date: Feb. 9, 2012

(65) Prior Publication Data
US 2013/0136387 A1   May 30, 2013

(30) Foreign Application Priority Data
Aug. 3, 2010   (DE) .......................... 10 2010 033 122

(51) Int. Cl.
*F16C 33/58*   (2006.01)
*F16C 19/30*   (2006.01)

(52) U.S. Cl.
CPC ................ *F16C 19/30* (2013.01); *F16C 33/58* (2013.01); *F16C 33/588* (2013.01); *F16C 2240/30* (2013.01); *F16C 2240/34* (2013.01)

(58) Field of Classification Search
CPC ............................... F16C 33/588; F16C 19/30

USPC .................................................. 384/618–622
See application file for complete search history.

(56) References Cited

U.S. PATENT DOCUMENTS 3,023,058 A * 2/1962 Bowers et al. ................ 384/620
5,433,137 A * 7/1995 Ikeda et al. ........................ 92/71
(Continued)

FOREIGN PATENT DOCUMENTS

DE   199 24 018 A1   12/1999
JP   7-119740 A   5/1995
(Continued)

OTHER PUBLICATIONS

Machine translation of JP 2007-170448.*
(Continued)

*Primary Examiner* — Thomas R Hannon
(74) *Attorney, Agent, or Firm* — Fitzpatrick, Cella, Harper & Scinto

(57) ABSTRACT

An axial roller bearing, in particular an axial needle bearing, having a first annular bearing disk and a second annular bearing disk that are each made of a thin-walled sheet steel and are arranged at a distance from one another on a common center axis, and a plurality of rolling elements, arranged next to one another, that roll between the axial inner sides—implemented as races—of the two bearing disks and that are held at uniform distances from one another by a bearing cage. The bearing disks are implemented as disk springs that deflect as a function of load and have races positioned at an angle, and are arranged relative to one another such that the rolling elements have low-friction point contact in the unloaded state of the axial roller bearing and only have load-bearing line contact with the races in the fully loaded state.

12 Claims, 3 Drawing Sheets

(56) References Cited

U.S. PATENT DOCUMENTS

| | | | |
|---|---|---|---|
| 6,338,613 B1* | 1/2002 | Okuno et al. | 92/71 |
| 8,157,451 B2 | 4/2012 | Solfrank et al. | |
| 8,448,765 B2 | 5/2013 | Lee | |
| 2002/0031289 A1* | 3/2002 | Kenney, Jr. | 384/620 |
| 2013/0170779 A1 | 7/2013 | Eckhoff et al. | |

FOREIGN PATENT DOCUMENTS

| | | |
|---|---|---|
| JP | 8-159150 A | 6/1996 |
| JP | 2004-324845 A | 11/2004 |
| JP | 2006-46559 A | 2/2006 |
| JP | 2007-170447 A | 7/2007 |
| JP | 2007-170448 A | 7/2007 |

OTHER PUBLICATIONS

Machine translation of JP 08-159150.*
International Search Report issued in connection with International Application No. PCT/EP2011/059319, on Aug. 19, 2011.
U.S. Appl. No. 14/009,267, filed Oct. 1, 2013.
U.S. Appl. No. 14/008,843, filed Sep. 30, 2013.

* cited by examiner

AXIAL ANTI-FRICTION BEARING, IN PARTICULAR AXIAL NEEDLE BEARING

FIELD OF THE INVENTION

The invention concerns an axial roller bearing, and it can be implemented to particular advantage in axial needle bearings for supporting planet carriers or clutch carriers or for the impeller or turbine wheel in automotive automatic transmissions.

BACKGROUND OF THE INVENTION

The most common implementation of automotive automatic transmissions is what is known as torque converter transmissions, which differ from conventional and automated manual transmissions primarily through a shifting process that does not interrupt tractive force. Such automotive automatic transmissions generally use a hydraulic torque converter as the starting clutch, consisting of an impeller, a stator, and a turbine wheel, and are composed primarily of a varying number of multi-plate clutches and a combination of multiple planetary gear sets. All shifting and clutch operations in this design take place by means of various one-way clutches and with the multi-plate clutches, which establish the frictional connection of the individual planetary gear set stages with the input and output shafts of the automatic transmission. A gear change thus takes place through gradual uncoupling of one control element consisting of a clutch and a shaft of a planetary gear set, and simultaneous coupling of a second control element for the next gear consisting of another clutch and another shaft of a planetary gear set, until the full torque of the first control element is taken on by the second control element at the end of the gear change.

Because substantial axial forces also act in the hydraulic torque converter and, during the individual shifting operations, between the multi-plate clutches and the planetary gear sets, in modern automatic transmissions the impeller and the turbine wheel, as well as the individual clutch carriers and planet carriers, are braced against one another by up to 17 axial needle bearings depending on the number of gears, in order to avoid frictional and efficiency losses. Axial needle bearings of this nature are known from the applicant's "Roller Bearings" catalog, January 2006, on pages 776 to 782, under the product designation AX, and consist essentially of a first annular bearing disk and a second annular bearing disk that are each made of a thin-walled sheet steel and are arranged at a distance from one another on a common center axis. The axial inner sides of the two bearing disks are implemented as races, and between them roll a plurality of bearing needles arranged next to one another, which are held at uniform distances from one another by a bearing cage; the bearing needles and bearing cage together form a needle roller and cage assembly.

However, under continuous operating conditions of such automatic transmissions, it has been shown that the axial needle bearings used still cause frictional losses that are a contributing cause of a reduction in the desired efficiency of the automatic transmission, and the reduction in said losses thus offers considerable potential, particularly against the background of present demands for reduction of $CO_2$ emissions from motor vehicles with internal combustion engines. The reduction in efficiency here can primarily be attributed to the frequent change of the axial needle bearings between the loaded and unloaded states resulting from the individual shifting operations in the automatic transmission. In this context, the axial needle bearings have high frictional torques in the loaded state that result from the line contact of the rolling elements to the races of the bearing disks and from the rolling element slip caused by the different rotational speeds at the inner and outer circles of the rolling elements. Although the frictional torque resulting from the line contact of the rolling elements with their races is reduced in the unloaded state of the axial roller bearings, the aforementioned rolling element slip increases in this state to such a degree that a kinematically undesirable rolling of the rolling elements on the races takes place to the point where the rolling elements or the entire needle cage comes to a standstill, with the rolling elements merely sliding over their races and thus producing a torque of similar magnitude to the loaded state of the axial roller bearing. Moreover, when sudden loading of the axial roller bearing and the associated abrupt acceleration of the needle roller and cage assembly take place, so-called smearing of the rolling elements on their races occurs, which in addition to frictional heating of the rolling elements causes increased wear of the races and is ultimately responsible for shortened service life of the axial needle bearings.

In order to avoid the disadvantages resulting from rolling element slip in axial roller bearings, DE 199 24 018 A1 proposed designing the races of the rolling elements with an inward curvature over their entire width, but such a measure was not able to attain the desired effect, or to attain it in full, since the axial deflection stiffness of bearing rings designed in this way has proven to still be too high, and the rolling element slip described above continues to occur in certain intermediate load regions; this slip is the cause of continuously high frictional torques in both the loaded and unloaded states of the axial roller bearings.

OBJECT OF THE INVENTION

Proceeding from the described disadvantages of the known state of the art, the object of the invention is to design an axial roller bearing, in particular an axial needle bearing, which is characterized, at least in the unloaded state, by substantially smaller frictional torques than in the loaded state.

DESCRIPTION OF THE INVENTION

According to the invention, this object is attained in an axial roller bearing in such a manner that the bearing disks of the axial roller bearing are implemented as disk springs that deflect as a function of load and have races positioned at an angle, and are arranged relative to one another such that the rolling elements have low-friction point contact in the unloaded state of the axial roller bearing and only have full load-bearing line contact with the races in the fully loaded state of the axial roller bearing.

The invention is thus based on the finding that integrating a disk spring function in the bearing disks of the axial roller bearing makes it possible in a simple manner to avoid the above-described unloaded states of axial roller bearings in which kinematically undesirable rolling of the rolling elements on the races takes place to the point where the rolling elements or the entire needle cage comes to a standstill, with the rolling elements merely sliding over their races and thus producing a torque of similar magnitude to the loaded state of the axial roller bearing. In this design, the disk spring function in the bearing disks has the effect, primarily in the unloaded state, that the bearing disks have a low-friction point contact with the rolling elements, so that the rolling elements roll on their races in a manner that is kinematically nearly optimal, causing considerably lower frictional torques than in the loaded state of the axial roller bearing. It is even possible that implementing only one of the two bearing disks as a disk spring will contribute to reducing the frictional torque of the axial roller bearing in the unloaded state.

Preferred embodiments and advantageous refinements of the axial roller bearing designed according to the invention are described below.

An example aspect of the invention is that provision is made in the axial roller bearing designed according to the invention that the angle of incidence of the race is designed to be positive on one bearing disk and the angle of incidence of the race is negative on the other bearing disk, and the two races are arranged to diverge from one another in a straight line. The positive or negative angle of incidence of the races in this design should be understood as being relative to the applicable plane of the inner diameter of the two races, which represents an imaginary reference line that the races diverge either upward or downward from. The arrangement of the two races in which they diverge from one another in a straight line then has the effect that the races of the two bearing disks in the unloaded state each stand in point contact with the rolling elements only at the inner circle diameter of the rolling elements, thus reducing the frictional torque in the axial roller bearing.

As an alternative embodiment of the axial roller bearing designed according to the invention, however, it is also possible to design the angle of incidence of the races of the two bearing disks to be positive so that the two races are arranged to be parallel to one another in a straight line. Here, too, the positive angle of incidence of the two races should again be understood as being relative to the applicable plane of the inner diameter of the two races, which represents an imaginary reference line that the races uniformly diverge upward from. The arrangement of the two races in which they are parallel to one another in a straight line has the effect in this case that in the unloaded state of the axial roller bearing, the race of one bearing disk stands in point contact with the rolling elements at the inner circle diameter of the rolling elements, and the race of the other bearing disk stands in point contact with the rolling elements at the outer circle diameter of the rolling elements, thus likewise reducing the frictional torque in the axial roller bearing.

Independently of the embodiments described, the axial roller bearing designed according to the invention additionally is characterized in that the bearing disks have equal sheet metal thicknesses and angles of incidence of equal size at their races, and are designed with the races having the same maximum deflection travel. This has proven especially advantageous with regard to achieving equal spring characteristics for the two bearing disks of the axial roller bearing. However, in certain applications it can also be advantageous to design the two bearing disks with different spring characteristics. In such cases, it is possible to use different sheet metal thicknesses for the two bearing disks with the same angle of incidence of the races, or to use equal sheet metal thicknesses for the bearing disks and to vary the angle of incidence of one race relative to the angle of incidence of the other race. Furthermore, another possibility for varying the spring characteristics of the bearing disks occurs when different sheet metal thicknesses are used for the bearing disks while the angles of incidence of the races also are different.

Moreover, a useful enhancement of the axial roller bearing designed according to the invention, which likewise is independent of the particular embodiment, is that the races of the two bearing disks are additionally designed with circumferential annular beads directed towards the rolling elements, the beads having a smaller width than the width of the rolling elements. By means of such annular beads, it is possible to partially make the preloading of the bearing disks, which is relatively soft with a smooth disk spring shape, somewhat harder within the spring characteristic if this should prove to be advantageous for specific applications. In this design, furthermore, such annular beads are suitable for targeted effects on the spring characteristics of the bearing disks, since it is also possible here to make said beads variable in their depth in such a manner that, for example, deeper annular beads are formed in the bearing disks in the case of relatively small sheet thicknesses and shallower annular beads are formed in the case of relatively large sheet thicknesses.

The arrangement of the annular beads in the races of the bearing disks also has a not inconsiderable effect on the frictional torque of the axial roller bearing in the unloaded state. In the first embodiment described of the axial roller bearing designed according to the invention, it is advantageous to position the annular beads precisely opposite one another in the races of the bearing disks, each in the vicinity of the inner circle diameter of the rolling elements, in order to retain the desired friction reduction of the axial roller bearing in the unloaded state over the greatest possible range. In the second embodiment mentioned, by contrast, it is more advantageous for the annular beads to be positioned precisely opposite one another in the races of the bearing disks, each on the pitch circle diameter of the rolling elements or in the vicinity thereof, since with this measure the relatively small race support of the rolling elements can be compensated for.

BRIEF DESCRIPTION OF THE DRAWINGS

The axial roller bearing designed in accordance with the invention is explained in detail below in multiple preferred embodiments with reference to the attached drawings. Shown are.

DETAILED DESCRIPTION OF THE DRAWINGS

Figure 1:
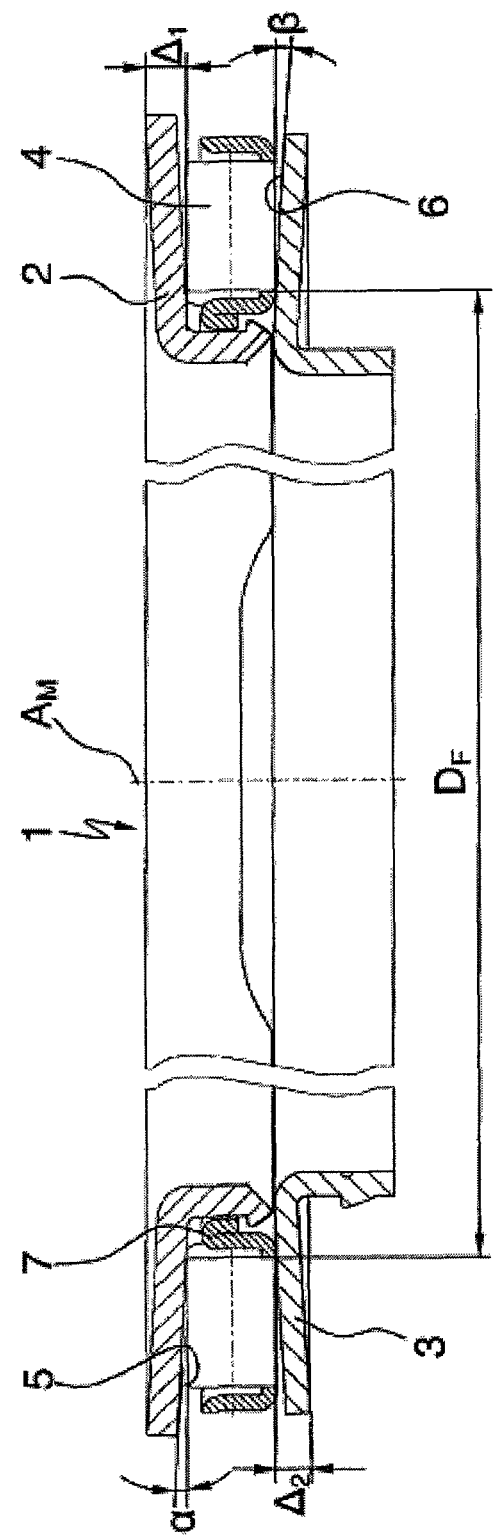
FIG. 1 an enlarged cross-section of a first embodiment of an axial roller bearing designed in accordance with the invention.
Figure 2:
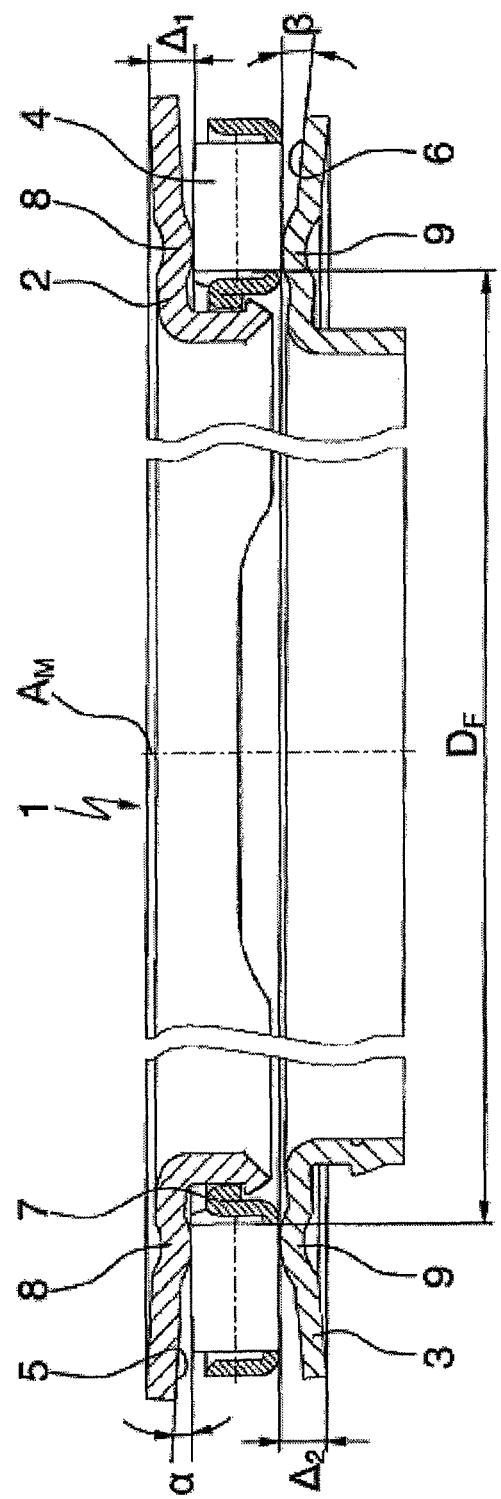
FIG. 2 an enlarged cross-section of a variant of the first embodiment of the axial roller bearing designed in accordance with the invention.
Figure 3:
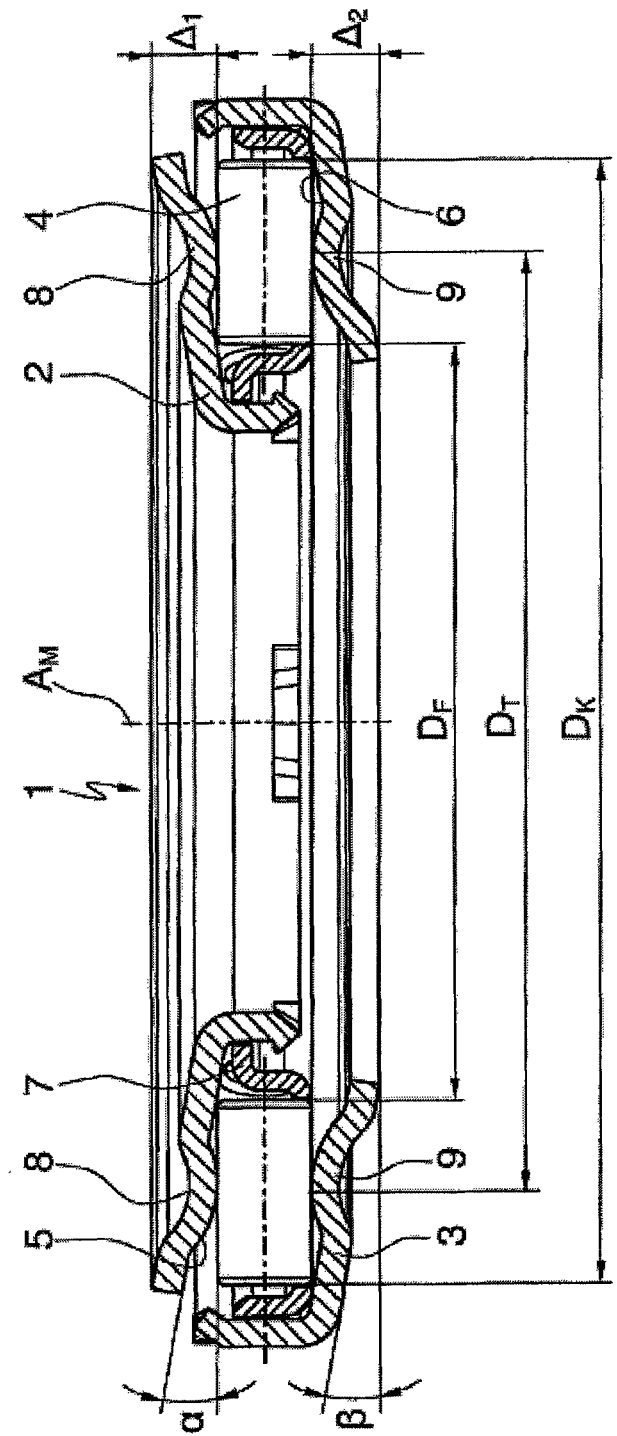
FIG. 3 an enlarged cross-section of a second embodiment of an axial roller bearing designed in accordance with the invention.

Visible in FIGS. 1 through 3 are three axial roller bearings 1, each implemented as a single-row axial needle bearing, which consist essentially of a first annular bearing disk 2 and a second annular bearing disk 3 that are each made of a thin-walled sheet steel, each of which has, formed on its inner diameter, a centering rib that is not labeled, and each of which is arranged at a distance from the other on a common center axis $A_M$. In addition, the axial roller bearing 1 has a plurality of rolling elements 4 arranged next to one another that are implemented in the form of bearing needles that roll between the axial inner sides—implemented as races 5, 6—of the two bearing disks 2, 3, and that are held at uniform distances from one another by a bearing cage 7.

In addition, it is clearly evident from all three figures that the bearing disks 2, 3 of the axial roller bearings 1 shown are implemented as disk springs that deflect as a function of load and have races 5, 6 positioned at an angle, and are arranged relative to one another such that the rolling elements 4 have low-friction point contact in the unloaded state of the axial roller bearing 1 and only have full load-bearing line contact with the races 5, 6 in the fully loaded state of the axial roller bearing 1. It is clearly visible in the axial roller bearings 1 shown in FIGS. 1 and 2 that the angle of incidence α—which is shown greatly exaggerated—of the race 5 of the first bearing disk 2 is positive in its implementation, while the likewise greatly exaggerated angle of incidence β of the race 6 of the second bearing disk 3 is negative in its implementation, so that the two races 5, 6 are arranged to diverge from one another in a straight line. In the case of the axial roller bearing 1 shown in FIG. 3, in contrast, the angles of incidence α, β, which again are shown exaggerated, of the races 5, 6 of the two bearing disks 2, 3 are positive, so that the two races 5, 6 are arranged to be parallel to one another in a straight line. In both cases, the positive or negative angle of incidence of the races 5, 6 is to be understood as relative to the planes (not shown) of the inner diameter of the two bearing disks 2, 3, each of which planes represents an imaginary reference line from which the races 5, 6 diverge upward or downward in the position shown.

Moreover, it can be seen in FIGS. 1 and 2 that in the unloaded state shown of the axial roller bearing 1, the races 5, 6 of each of the two bearing disks 2, 3 stand in point contact with the rolling elements 4 only at the inner circle diameter $D_F$ of the rolling elements 4. In contrast, in the embodiment shown in FIG. 3, in the unloaded state of the axial roller bearing 1 the races 5, 6 of the two bearing disks 2, 3 stand in point contact with the rolling elements 4 only at their inner circle diameter $D_F$ or outer circle diameter $D_K$, respectively, with both types of point contact reducing the frictional torque in the axial roller bearing 1.

An advantageous refinement of the axial roller bearing 1 shown in the drawings is that the bearing disks 2, 3 have equal sheet thicknesses and equal angles of incidence α, β at their races 5, 6 and are designed with the same maximum deflection travel $\Delta_1$, $\Delta_2$ of the races 5, 6. In this way, it is possible to achieve identical spring characteristics for both bearing disks 2, 3 of the axial roller bearing 1 with continuously soft preloading. However, if it should prove to be advantageous for specific applications to partially make this soft preloading of the bearing disks 2, 3 somewhat harder within the spring characteristic, it is also possible as shown in FIGS. 2 and 3 to additionally design the races 5, 6 of both bearing disks 2, 3 with circumferential annular beads 8, 9 that face the rolling bodies 4 and have widths smaller than the width of the rolling bodies 4.

In the variant of the first embodiment of the axial roller bearing 1 shown in FIG. 2, it has proven most advantageous in this regard for these annular beads 8, 9 to be positioned precisely opposite one another in the races 5, 6 of the bearing disks 2, 3, each in the vicinity of the inner circle diameter $D_F$ of the rolling elements 4 in order to achieve the greatest possible reduction in friction of the axial roller bearing 1 in the unloaded state. In contrast, in the second embodiment of the axial roller bearing 1 shown in FIG. 3, it is more advantageous for the annular beads 8, 9 to be positioned precisely opposite one another in the races 5, 6 of the bearing disks 2, 3, each on the pitch circle diameter $D_T$ of the rolling elements 4, in order to compensate for the relatively small race support of the rolling elements 4 in this embodiment.

LIST OF REFERENCE NUMBERS 1 axial roller bearing
2 first bearing disk
3 second bearing disk
4 rolling element
5 race on 2
6 race on 3
7 bearing cage
8 annular bead in 5
9 annular bead in 6
$A_M$ center axis of 1
α angle of incidence of 5
β angle of incidence of 6
$D_F$ inner circle diameter of 4
$D_K$ outer circle diameter of 4
$D_T$ pitch circle diameter of 4
$\Delta_1$ deflection travel of 5
$\Delta_2$ deflection travel of 6

The invention claimed is:

1. An axial roller bearing comprising:
a first annular bearing disk and a second annular bearing disk that are each made of a sheet steel and are arranged at a distance from one another on a common center axis; and
a plurality of rolling elements arranged next to one another that (1) roll between axial inner sides of the axial roller bearing, the axial inner sides being implemented as races of the two bearing disks, and (2) are held at uniform distances from one another by a bearing cage,
wherein the bearing disks are implemented as disk springs that deflect as a function of load and have races positioned at an angle, and are arranged relative to one another such that the rolling elements have low-friction point contact in the unloaded state of the axial roller bearing and only have full load-bearing line contact with the races in the fully loaded state of the axial roller bearing,
wherein angles of incidence of the races of the two bearing disks are designed to be positive, and
wherein the races are arranged to be parallel to one another in a straight line.

2. The axial roller bearing according to claim 1, wherein the races of the two bearing disks in the unloaded state of the axial roller bearing each stand in point contact with the rolling elements at an inner circle diameter or at an outer circle diameter of the rolling elements.

3. The axial roller bearing according to claim 1, wherein the bearing disks have equal sheet metal thicknesses and angles of incidence of equal size at their races, and are designed with the races having the same maximum deflection travel.

4. The axial roller bearing according to claim 1, wherein the races of the bearing disks are designed with circumferential annular beads directed towards the rolling elements, the circumferential annular beads having a smaller width than a width of the rolling elements.

5. The axial roller bearing according to claim 4, wherein the annular beads are positioned precisely opposite one another in the races of the bearing disks, each on a pitch circle diameter of the rolling elements.

6. An axial roller bearing, comprising:
a first annular bearing disk and a second annular bearing disk that are each made of a sheet steel and are arranged at a distance from one another on a common center axis; and
a plurality of rolling elements arranged next to one another that (1) roll between axial inner sides of the axial roller bearing, the axial inner sides being implemented as races of the two bearing disks, and (2) are held at uniform distances from one another by a bearing cage,
wherein the bearing disks are implemented as disk springs that deflect as a function of load and have races positioned at an angle, and are arranged relative to one another such that the rolling elements have low-friction point contact in the unloaded state of the axial roller bearing and only have full load-bearing line contact with the races in the fully loaded state of the axial roller bearing, wherein a first angle of incidence of a first race is designed to be positive on one bearing disk and a second angle of incidence of a second race is negative on another bearing disk, wherein the first and second races are arranged to diverge from one another in a straight line, and wherein the bearing disks have equal sheet metal thicknesses and angles of incidence of equal size at their races, and are designed with the races having the same maximum deflection travel.

7. The axial roller bearing according to claim 6, wherein the races of the two bearing disks in the unloaded state of the axial roller bearing each stand in point contact with the rolling elements only at an inner circle diameter of the rolling elements.

8. The axial roller bearing according to claim 6, wherein the races of the bearing disks are designed with circumferential annular beads directed towards the rolling elements, and wherein the annular beads are positioned precisely opposite one another in the races of the bearing disks, each in the vicinity of an inner circle diameter of the rolling elements.

9. An axial roller bearing, comprising:

a first annular bearing disk and a second annular bearing disk that are each made of a sheet steel and are arranged at a distance from one another on a common center axis; and a plurality of rolling elements arranged next to one another that (1) roll between axial inner sides of the axial roller bearing, the axial inner sides being implemented as races of the two bearing disks, and (2) are held at uniform distances from one another by a bearing cage, wherein the bearing disks are implemented as disk springs that deflect as a function of load and have races positioned at an angle, and are arranged relative to one another such that the rolling elements have low-friction point contact in the unloaded state of the axial roller bearing and only have full load-bearing line contact with the races in the fully loaded state of the axial roller bearing, wherein the races of the bearing disks are designed with circumferential annular beads directed towards the rolling elements, the circumferential annular beads having a smaller width than a width of the rolling elements.

10. The axial roller bearing according to claim 9, wherein the races of the two bearing disks in the unloaded state of the axial roller bearing each stand in point contact with the rolling elements only at an inner circle diameter of the rolling elements.

11. The axial roller bearing according to claim 9, wherein the annular beads are positioned precisely opposite one another in the races of the bearing disks, each in the vicinity of an inner circle diameter of the rolling elements.

12. The axial roller bearing according to claim 9, wherein the annular beads are positioned precisely opposite one another in the races of the bearing disks, each on a pitch circle diameter of the rolling elements.

* * * * *